(12) United States Patent
Kono

(10) Patent No.: US 7,236,467 B2
(45) Date of Patent: Jun. 26, 2007

(54) CDMA COMMUNICATION SYSTEM WITH PILOT POWER CONTROL UNIT

(75) Inventor: Masaki Kono, Saitama (JP)

(73) Assignee: NEC Corporation, Tokyo (JP)

( * ) Notice: Subject to any disclaimer, the term of this patent is extended or adjusted under 35 U.S.C. 154(b) by 723 days.

(21) Appl. No.: 09/879,149

(22) Filed: Jun. 13, 2001

(65) Prior Publication Data

US 2001/0055289 A1 Dec. 27, 2001

(30) Foreign Application Priority Data

Jun. 14, 2000 (JP) ............................. 2000-178990

(51) Int. Cl.
*H04B 7/216* (2006.01)
(52) U.S. Cl. .................. 370/320; 370/331; 370/335
(58) Field of Classification Search ................. 370/320, 370/335, 342; 455/69, 522, 436–442
See application file for complete search history.

(56) References Cited

U.S. PATENT DOCUMENTS

| | | | |
|---|---|---|---|
| 5,245,629 A * | 9/1993 | Hall ............................. 455/522 |
| 5,715,526 A * | 2/1998 | Weaver et al. ............... 455/522 |
| 5,839,056 A * | 11/1998 | Hakkinen ..................... 455/69 |
| 5,930,242 A * | 7/1999 | Mimura ....................... 370/331 |
| 6,285,663 B1 * | 9/2001 | Esmailzadeh ................ 370/311 |
| 6,286,994 B1 * | 9/2001 | Boesel et al. ................ 374/146 |
| 6,366,778 B1 * | 4/2002 | Bender et al. ............... 455/442 |
| 6,587,696 B1 * | 7/2003 | Ma et al. ...................... 455/522 |
| 6,603,746 B1 * | 8/2003 | Larijani et al. .............. 370/318 |
| 6,643,520 B1 * | 11/2003 | Park et al. ................... 455/522 |
| 6,724,719 B1 * | 4/2004 | Tong et al. ................... 370/209 |
| 6,831,910 B1 * | 12/2004 | Moon et al. ................. 370/342 |
| 6,904,293 B2 * | 6/2005 | Wakizaka .................... 455/522 |

FOREIGN PATENT DOCUMENTS

| | | |
|---|---|---|
| JP | 6-268574 A | 9/1994 |
| JP | 09-200837 | * 7/1997 |
| JP | 9-200837 A | 7/1997 |
| JP | 11-150754 A | 6/1999 |
| WO | WO 97/08909 A1 | 3/1997 |

* cited by examiner

*Primary Examiner*—Doris H. To
*Assistant Examiner*—Ian N. Moore
(74) *Attorney, Agent, or Firm*—Sughrue Mion, PLLC

(57) ABSTRACT

A satisfactory reception environment is secured efficiently regardless of a degree of the traffic intensity. A pilot power control unit is provided to a base station radio unit. The pilot power control unit controls a desired wave power-to-interference wave power ratio of a pilot signal to stay at a preset value. More specifically, upon receipt of a multiplex wave from a multiplexing unit, the pilot power control unit computes a desired wave power-to-interference wave power ratio of a pilot signal. Then, the pilot power control unit transmits a command signal to a coder to change a transmission power value of the pilot signal in an amount corresponding to a difference between the computed desired wave power-to-interference wave power ratio and a set desired wave power-to-interference wave power ratio.

6 Claims, 8 Drawing Sheets

PRIOR ART

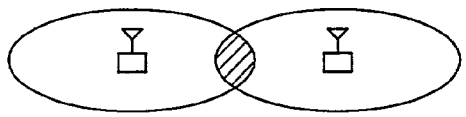
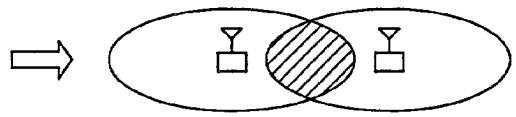
NORMAL        WHEN SHORTER DISTANCE
IS GIVEN BETWEEN BASE
 SOFT H/O AREA    STATIONS
FIG. 9A            FIG. 9B
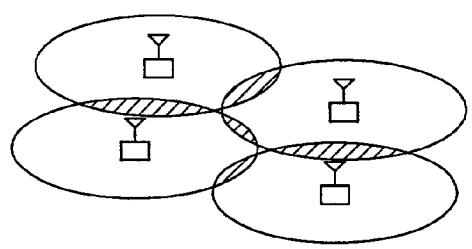
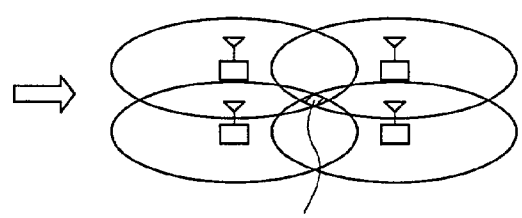
NORMAL        PILOT POLLUTION AREA
WHEN SHORTER DISTANCE
IS GIVEN BETWEEN BASE
STATIONS
FIG. 9C            FIG. 9D

CDMA COMMUNICATION SYSTEM WITH PILOT POWER CONTROL UNIT

BACKGROUND OF THE INVENTION

The present invention relates to a radio communication system using the CDMA (Code Division Multiple Access) communication method abide by the IS-95 standard, and more particularly to control of the transmission power of a base station radio unit in a radio communication system.

A method of connecting a plurality of mobile stations to a base station in the same frequency band is referred to as multiplex access or multiple access. With the CDMA (Code Division Multiple Access) communication method, multiple access is performed by the spread spectrum communication. The spread spectrum communication is a communication means for transmitting spectrum an information signal by spreading a spectrum thereof to a sufficiently wide bandwidth compared with the original information bandwidth.

Each information signal is assigned with a spread code sequence orthogonal to each other. Each information signal is multiplied with the assigned spread code sequence to be spread. This makes it possible to share one particular frequency with a plurality of communications, and therefore, all the desired wave signals and interference wave signals contained in a multiplex wave transmitted from one particular base station reach mobile stations via a single transmission channel. Then, at the end of each mobile station, a desired wave signal is extracted by using the same spread code sequence.

In the radio communication system using the CDMA communication method, each service area allocated to one base station is referred to as a cell. Each cell covers a circular area with the base station at the center. However, such a circular area is susceptible to geographical conditions, such as buildings, mountains, etc., in practice. Hereinafter, to locate a base station in a service area is refer to as "BS (Base Station) location". The BS location in consideration with a size of the allocated service area is referred to as "cell design". By aligning each cell so as to slightly overlap the adjacent one without leaving any space by cell design, a region is filled with the service areas.

A down link information signal transmitted from the base station to each mobile station includes, besides a speech frame signal containing speech data or the like, a base station selection signal referred to as a pilot signal. Each mobile station judges its currently located cell (cell in service) based on the reception pilot signal. Each base station multiplexes the speech frame signal and pilot signal by spreading spectrum with the spreading code sequence uniquely assigned to each base station. Each base station transmits the multiplex wave thus generated while controlling the transmission power.

If a mobile station travels during a call, the reception level of the pilot signal that has been received is lowered. Hence, the mobile station is re-located in another cell in which a pilot signal with a higher reception level is transmitted. As a result, the base station that communicates with the mobile station switches to another base station. This is referred to as handover (hereinafter, referred to as H/O), and in the CDMA communication system, smooth H/O is performed such that permits the mobile station to continue a call without interruption by allowing the mobile station to receive multiplex waves from a plurality of base stations simultaneously. This is referred to as soft H/O. The soft H/O is one of the important characteristics of the CDMA communication method.

As to the cell design, in general, a radius of cell indicating the size of the cell is determined by setting a limit level necessary to perform the soft H/O in a desired wave power-to-interference wave power ratio (hereinafter, referred to as Ec/lo) per chip (time width of the smallest change in the spread signal) of the pilot signal. A certain Ec/lo set in this manner is referred to as the set Ec/lo.

The following description will describe a conventional radio communication system using the CDMA communication method with reference to the accompanying drawings. In the first place, explanation is given to an arrangement of the radio communication system using the CDMA communication method.

FIG. 2 is a view showing an arrangement of the radio communication system using the CDMA communication method.

As shown in the drawing FIG. 2, the radio communication system using the CDMA communication method comprises: a base station control unit (hereinafter, referred to as BSC) 10 for providing a CDMA communication service; a plurality of base station radio units (hereinafter, referred to as BTSs) 20-1 through 20-$n$ each connected to the BSC 10 via a special line 1; and mobile station terminal units (hereinafter, referred to as MSs) 30-1 through 30-$m$ for communicating with the BTSs 20.

Next, the following description will describe a structure of each signal frame handled in the present system with reference to FIGS. 4 through 6. FIG. 4 is a view showing a structure of a speech frame signal 50. As shown in the drawing, the speech frame signal 50 is composed of speech data 51 and speech data signal pass/fail information 52.

FIG. 5 is a view showing a structure of transmission power report information 60. As shown in the drawing, the transmission power report information 60 is composed of electric field intensity 61, a measured frame number 62, and an error frame number 63.

FIG. 6 is a view showing a structure of a speech control frame signal 70. As shown in the drawing, the speech control frame signal 70 is composed of speech data 64, transmission power report information 60, and speech data signal quality information 65.

Next, the following description will describe an arrangement of each MS 30 used in the radio communication system using the CDMA communication method. FIG. 8 is a view showing an arrangement of the MS 30 used in the radio communication system using the CDMA communication method.

As shown in the drawing, the MS 30 comprises: a mixing unit (hereinafter, referred to as M unit) 35 for receiving and outputting a radio signal 2 a receiving unit (hereinafter, referred to as RX unit) 31 for receiving the radio signal 2 via the M unit 35 and demodulating the same; a decoder 33 for decoding the demodulated signal into the speech frame signal 50; a speech frame signal mixing unit 36 for judging usable speech data 51 based on the speech data signal pass/fail information 52 contained in the speech frame 50 and composing the usable speech data 51 by assigning weights with the reception signal electric field intensity; a speech coder 37 for converting the speech data 51 into a speech signal; a coder 34 for encoding the speech data 64; and a transmitting unit (hereinafter, referred to as TX unit) 32 for modulating the encoded signal and transmitting the resulting signal.

Next, the following description will describe an operation of the radio communication system using the CDMA communication method.

The RX unit 31 receives a radio signal 2 via the M unit 35. The radio signal 2 referred to herein is a multiplex wave generated by multiplexing the speech frame signal 50 shown in FIG. 4 and an unillustrated pilot signal. Then, the reception signal is decoded by the decoder 33, and reproduced as the speech frame signal 50. The speech frame signal mixing unit 36 composes a certain number of speech frame signals 50 presumed to be in the same frame by assigning weights for each reception signal electric field intensity. Subsequently, the speech frame signal mixing unit 36 decides whether the speech data 51 should be transmitted to the speech coder 37 or not based on the speech data signal pass/fail information 52 contained in the speech frame signal 50.

Further, the speech frame signal mixing unit 36 stores the speech data signal pass/fail information 52 for a certain period notified through notification information from the BTS 20. Then, the speech frame signal mixing unit 36 generates the transmission power report information 60 as shown in FIG. 5. The transmission power report information 60 is composed with the transmission speech data 64 and sent to the coder 34. The composed signal is encoded by the coder 34 and outputted as the speech control frame signal 70 as shown in FIG. 6. The speech control frame signal 70 is modulated by the TX unit 32 and outputted to the BTS 20 via the M unit 35.

Next, the following description will describe, with reference to FIG. 1, an arrangement and an operation of the conventional base station of the CDMA communication method.

As shown in FIG. 1, the conventional BTS 20 comprises: an M unit 28 for receiving and outputting a radio signal 2; an RX unit 21 for receiving and demodulating the radio signal 2; a decoder 23 for decoding the demodulated signal into the speech control frame signal 70; a coder 24 for encoding the speech frame signal 50 sent via the special line 1; a multiplexing unit 26 for composing the encoded signals; a TX unit 22 for modulating the multiplexed signal and transmitting the resulting signal; and a transmission power control unit 25 for varying transmission power of the speech frame signal 50 by computing the electric field intensity 61 and a reference value sent via the special line 1.

On the other hand, the BSC 10 comprises a speech frame signal selecting unit 11, a speech coder 12, and a control processing unit 13.

Next, the following description will describe operations of the BSC 10 and BTS 20. In the first place, at the end of the BTS 20, the RX unit 21 receives a radio signal 2 via the M unit 28. The reception radio signal 2 is decoded by the decoder 23, and reproduced as the speech control frame signal 70. The speech control frame signal 70 is sent to the BSC 10 via the special line 1. The speech control frame signal 70 sent to the BSC 10 is inputted into the speech frame signal selecting unit 11. The speech frame signal selecting unit 11 transmits the speech data 64 contained in the speech control frame signal 70 to the speech coder 12. The speech coder 12 converts the reception speech data 64 into a speech signal.

The speech frame signal selecting unit 11 also transmits the transmission power report information 60 contained in the speech control frame signal 70 to the control processing unit 13. The control processing unit 13 generates a reference value 80 based on the measured frame number 62 and error frame number 63 contained in the transmission power report information 60.

The control processing unit 13 lowers the reference value 80, if the error frame number 63 contained in the transmission power report information 60 is lower than a predetermined threshold value. The control processing unit 13 maintains the reference value 80, if the error frame number 63 is equal to the predetermined threshold value. The control processing unit 13 increases the reference value 80, if the error frame number 63 is greater than the predetermined threshold value.

The BSC 10 sends out the electric field intensity 61 and reference value 80 to the BTS 20 via the special line 1.

At the end of the BTS 20, based on the electric field intensity 61 and reference value 80 sent from the BSC 10 via the special line 1, the transmission power control unit 25 computes an optimal transmission power value of the speech frame signal 50. The transmission power value thus computed is sent to the coder 24. The coder 24 encodes the speech frame signal 50 and pilot signal, and at the same time, determines the transmission power according to a down link transmission power value. Here, the pilot signal is used in selecting the base station. The down link transmission power value is defined as a sum value of the transmission power value of the speech frame signal 50 and the transmission power value of the pilot signal determined by the cell design. The multiplexing unit 26 generates a multiplex wave by multiplexing the encoded speech frame signal 50 and pilot signal, which is sent to the TX unit 22. The TX unit 22 outputs the multiplex wave thus generated to the MS 30 via the M unit 28 as the radio signal 2.

Incidentally, if traffic intensity per cell increases, so does the power allocated to the speech frame signal. Likewise, if the power allocated to the speech frame signal increases, so does the down link transmission power value. On the other hand, the larger the power of the multiplex wave, the larger an output from an amplifier circuit becomes from the physical viewpoint. Hence, the TX unit 22 has the maximum output power allowable standard. Accordingly, a limit with respect to a physical size is set for an output from the amplifier circuit in the TX unit 22. This is done, so that output power exceeding the maximum output power allowable standard value will not be outputted. More specifically, the transmission power of the multiplex wave sent from the multiplexing unit 26 is suppressed by providing an ATT (attenuator) at the input within the TX unit 22. Consequently, it is possible to control the output power of the radio signal 2 outputted from the TX unit 22.

The prior art discussed above has the following problems.

That is, the pilot signal contained in the multiplex wave received by the MS will not be attenuated in the TX unit if the down link transmission power value is within the maximum output power allowable standard of the TX unit. Hence, the pilot signal is kept transmitted continuously from the base station while maintaining the level corresponding to the set Ec/Io.

However, if the traffic intensity per cell (or per sector) increases, the transmission power value of the speech frame signal increases in trying to establish more connections. Accordingly, the down link multiplex wave transmission power exceeding the maximum output power allowable standard value is sent from the multiplexing unit to the TX unit. Hence, the down link multiplex wave transmission power is attenuated by the ATT. This attenuation reduces a ratio of the transmission power value of the pilot signal contained in the multiplex wave even if the transmission power value of the pilot signal remains the same. In short, the Ec/Io of the pilot signal becomes smaller than the set Ec/Io value. This causes problems as described below.

The following description will describe the above-mentioned problems with reference to FIG. 3 and FIGS. 9A through 9D. FIG. 3 is a view showing comparison of the cells for the base stations to which the BS location has been performed. FIGS. 9A through 9D are views showing comparison between a normal BS location and a BS location given with a shorter distance between the base stations.

In the first place, as shown in FIG. 3, the Ec/lo of the pilot signal becomes smaller than the set Ec/lo as the traffic intensity increases, and the radius of the cell becomes smaller than the area of the cell design. When the radius of the cell becomes smaller, either the overlapping area of the cells is diminished or lost. This raises a problem that the soft H/O function unique to the CDMA communication is not performed smoothly or cannot be performed at all.

On the other hand, Solving the above problem by the cell design would cause a problem as follows. That is, suppose that the BS location is performed by giving a shorter distance between the base stations as shown in FIG. 9B to the cell design given with a normal distance as shown in FIG. 9A, so that the cells overlap in a larger area. This cell design, however, requires a greater number of base stations, which increases the construction cost and imposes a burden. Also, as discussed above, if the traffic intensity is low, the size of the cell changes, thereby expanding the area where the soft H/O is performed. This will become a problem in that the utilization of a radio channel is increased.

In practice, the normal cell design such that every two cells overlap as shown in FIG. 9C will become the cell design such that generates areas where three or four cells overlap as shown in FIG. 9D. When this happens, the interference power lo increases, and as a result, the desired wave power Ec of the pilot signal is reduced relatively. In short, a pilot pollution state occurs. The pilot pollution state is defined as a state where an effective pilot signal with a high Ec/lo is absent and many pilot signals with a low (the limit level necessary to perform the soft H/O) Ec/lo are present. In the pilot pollution state, the soft H/O is performed so frequently that the sound quality is deteriorated. Also, such frequent soft H/O causes a problem that the system becomes too tight.

SUMMARY OF THE INVENTION

The present invention is devised to solve the above problems without changing the cell design. The present invention therefore has an object to secure a satisfactory reception environment efficiently regardless of a degree of the traffic intensity. More concretely, the present invention has an object to secure the soft H/O function, which is one of the important characteristics of the CDMA communication method, throughout the areas even when the traffic intensity per cell is high.

The present invention has another object to provide a communication service with a satisfactory sound quality by avoiding the pilot pollution caused when the traffic intensity per cell is low and thereby preventing the system from becoming too tight.

A first aspect of the invention provides a radio communication system using a CDMA communication method, comprising a base station radio unit, a base station control unit, and a mobile station terminal unit, characterized in that the base station radio unit comprises a pilot power control unit for controlling a desired wave power-to-interference wave power ratio of a pilot signal to stay at a preset value.

A second aspect of the invention provides a radio communication system using a CDMA communication method according to the first aspect of the invention, characterized in that the pilot power control unit receives a multiplex wave from a multiplexing unit, and controls the desired wave power-to-interference wave power ratio of the pilot signal to stay at the preset value only when multiplex wave power exceeds a predetermined value.

A third aspect of the invention provides a radio communication system using a CDMA communication method according to the first aspect of the invention, characterized in that the base station radio unit comprises a coder, a multiplexing unit, and the pilot power control unit, and that the pilot power control unit receives a multiplex wave from the multiplexing unit, computes a desired wave power-to-interference wave power ratio of the pilot signal, and transmits a command signal to the coder to change a power transmission value of the pilot signal in an amount corresponding to a difference between the desired wave power-to-interference wave power ratio computed and a set desired wave power-to-interference wave power ratio.

A fourth aspect of the invention provides a radio communication system using a CDMA communication method according to the first aspect of the invention, characterized in that the base station radio unit comprises a coder, a multiplexing unit, and the pilot power control unit, and that the pilot power control unit receives a multiplex wave from the multiplexing unit, and transmits a command signal to the coder to change a transmission power value of the pilot signal only when multiplex wave power exceeds a predetermined value.

A fifth aspect of the invention provides a radio communication system using a CDMA communication method according to the first aspect of the invention, characterized in that the base station radio unit comprises a coder, a multiplexing unit, and the pilot power control unit, and that the pilot power control unit receives a multiplex wave from the multiplexing unit, and only when multiplex wave power exceeds a predetermined value, the pilot power control unit computes a desired wave power-to-interference wave power ratio of the pilot signal, and transmits a command signal to the coder to increase a transmission power value of the pilot signal set by the coder, so that the desired wave power-to-interference wave power ratio computed is equal to a set desired wave power-to-interference wave power ratio.

BRIEF DESCRIPTION OF THE DRAWINGS

FIGS. 9A through 9D are views showing comparison between a normal BS location and a BS location given with a shorter distance between the base stations to explain one embodiment of the present invention or a conventional example;

DESCRIPTION OF THE PREFERRED EMBODIMENTS

The following description will describe a control method of the transmission power of a pilot signal in the CDMA communication method in accordance with one embodiment of the present invention. It should be appreciated, however, that the following embodiment is for illustrative purpose only, and the present is not limited thereto.

Figure 1:
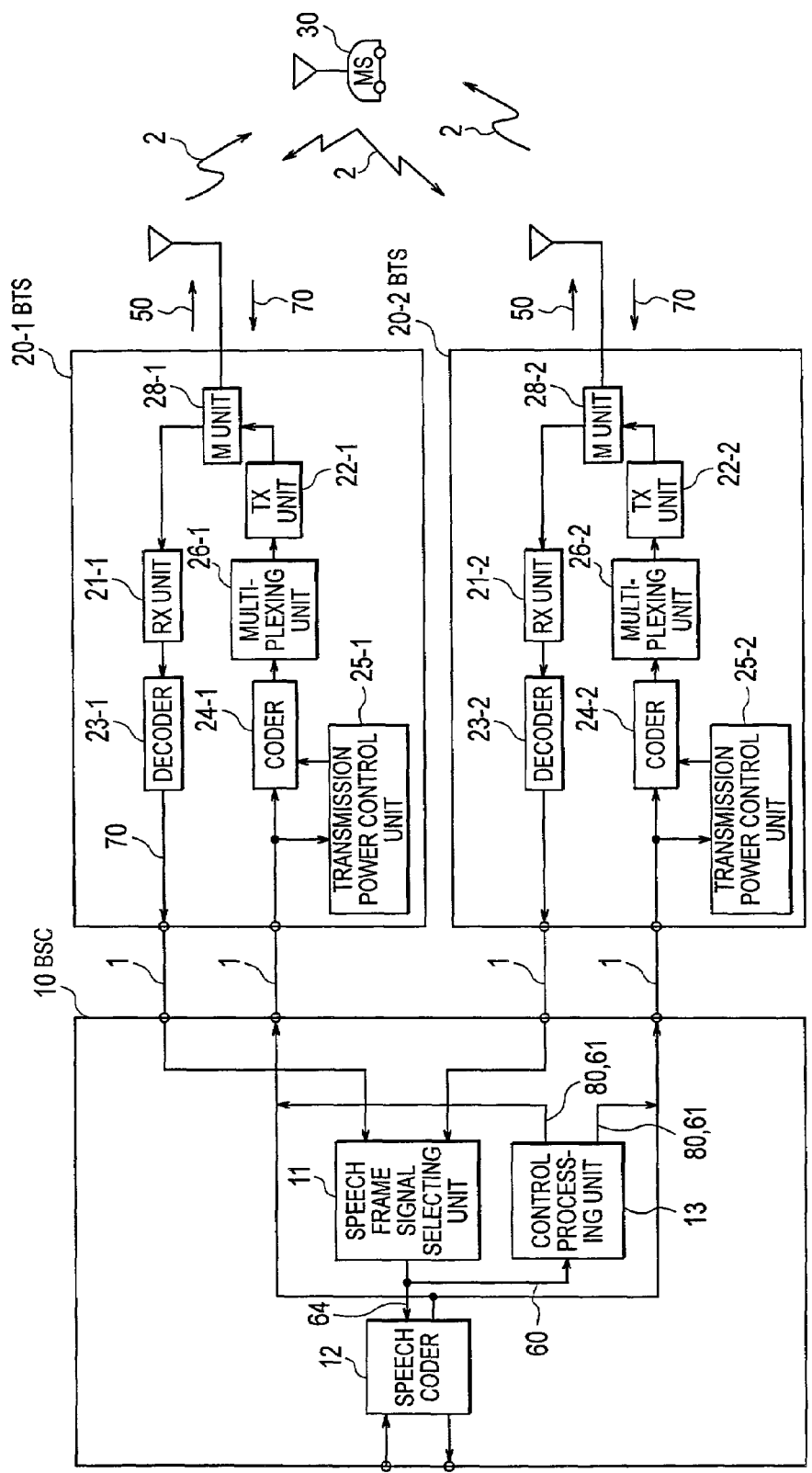
FIG. 1 is a view showing an arrangement of a conventional radio communication system using the CDMA communication method.
Figure 2:
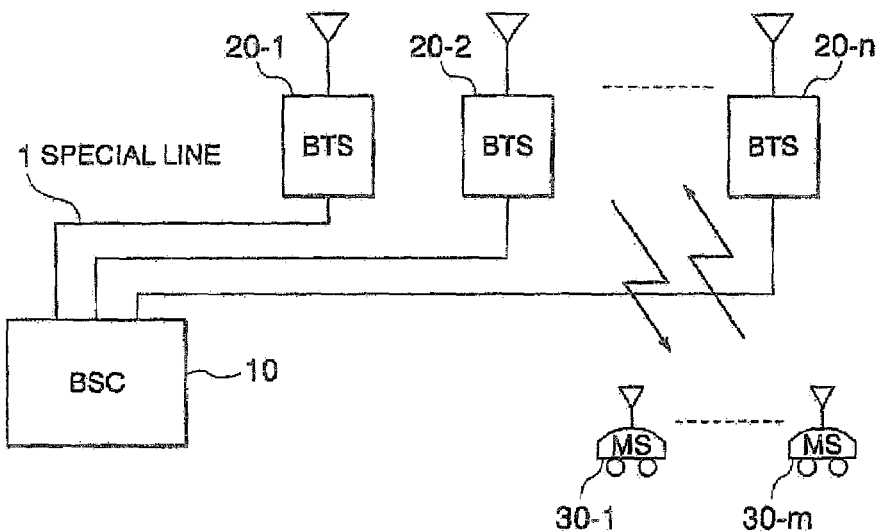
FIG. 2 is a view showing an arrangement of a radio communication system using the CDMA communication method to explain an embodiment of the present invention or a conventional example.
Figure 3:
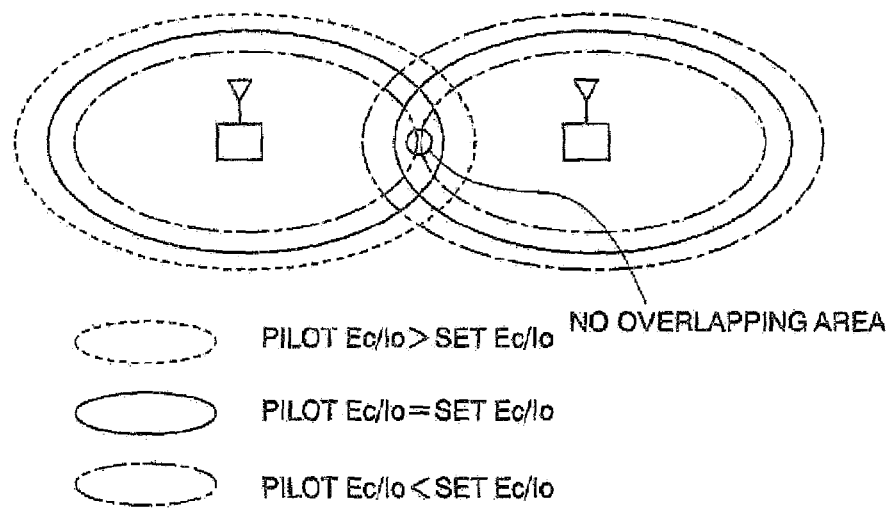
FIG. 3 is a view showing comparison of cells of base stations to which the BS location has been performed to explain one embodiment of the present invention or a conventional example.
Figure 4:
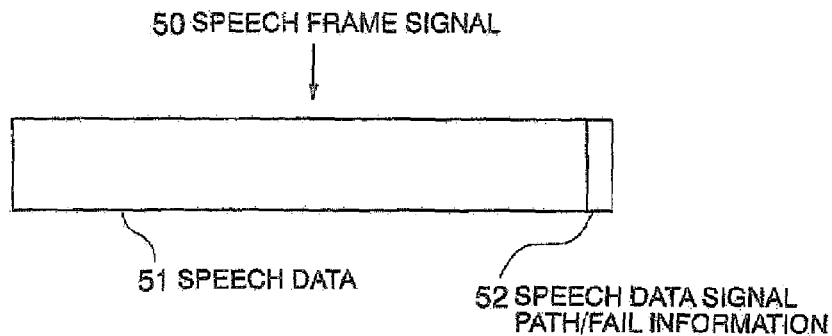
FIG. 4 is a view showing a structure of a speech frame signal 50 to explain one embodiment of the present invention or a conventional example.
Figure 5:
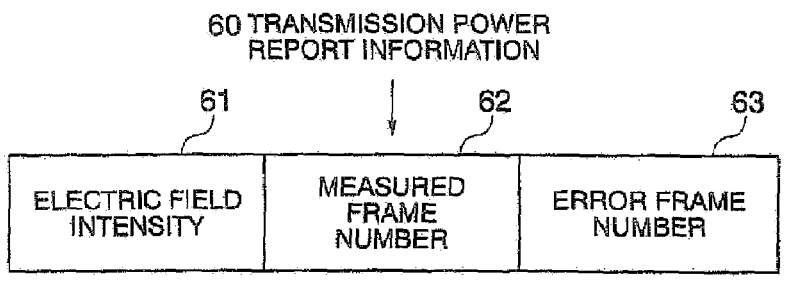
FIG. 5 is a view showing a structure of transmission power report information 60 to explain one embodiment of the present invention or a conventional example.
Figure 6:
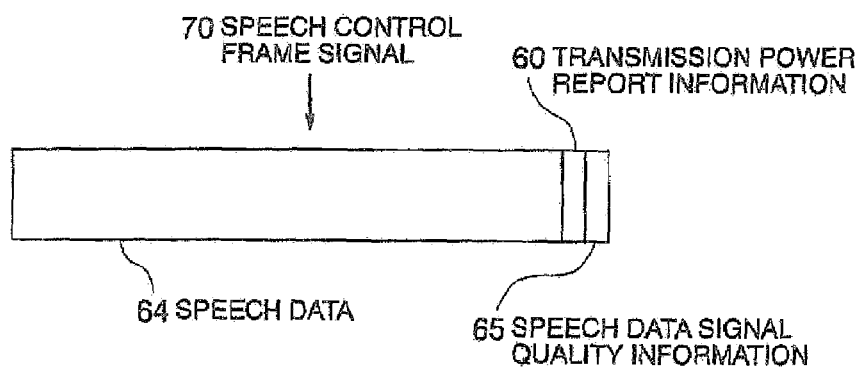
FIG. 6 is a view showing a structure of a speech control frame signal 70 to explain one embodiment of the present invention or a conventional example.
Figure 7:
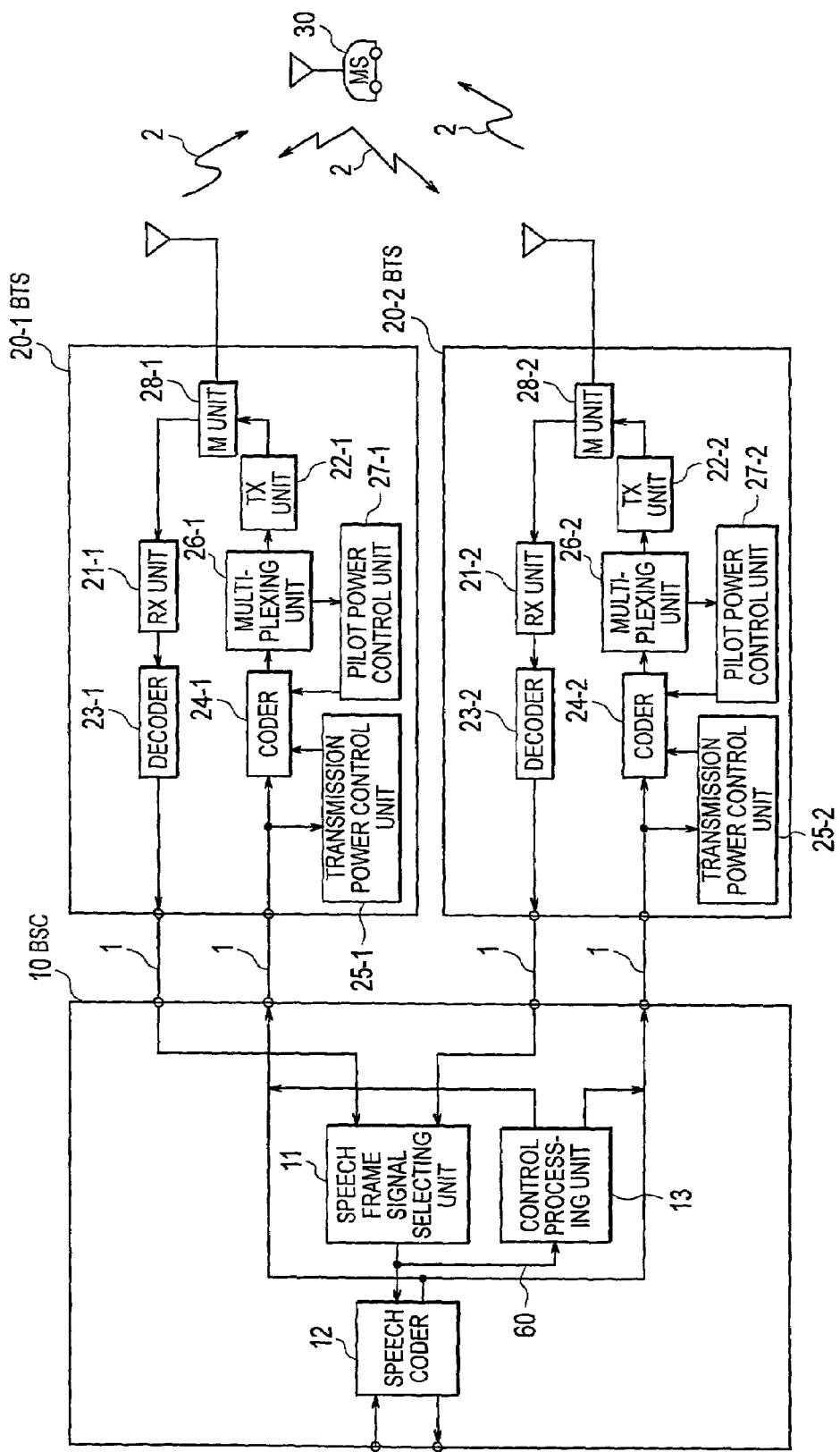
FIG. 7 is a view showing an arrangement of a radio communication system using the CDMA communication method in accordance with one embodiment of the present invention.
Figure 8:
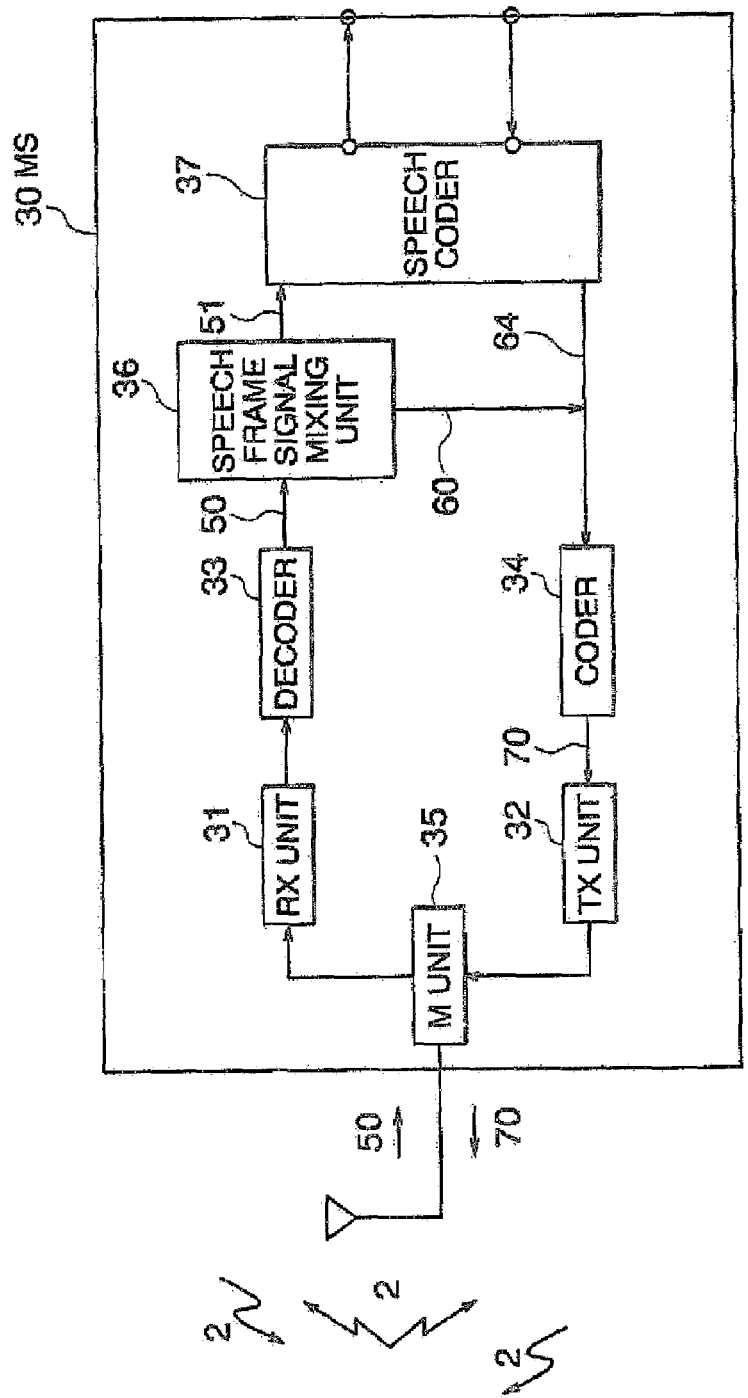
FIG. 8 is a view showing an arrangement of an MS 30 used in the radio communication system using the CDMA communication method to explain one embodiment of the present invention or a conventional example.

In the first place, with reference to FIGS. 7 and 8, explanation is given to an arrangement of a control system of the transmission power of a pilot signal in the CDMA communication method in accordance with one embodiment of the present invention.

FIG. 7 is a view showing an arrangement of the control system of the transmission power of a pilot signal in the CDMA communication method in accordance with one embodiment of the present invention.

As shown in the drawing, a BTS 20 comprises: an RX unit 21 for receiving and demodulating a radio signal 2; a decoder 23 for decoding the demodulated signal into a speech control frame signal 70; a coder 24 for encoding a speech frame signal 50 sent via a special line 1; a multiplexing unit 26 for composing the encoded signals; a pilot power control unit 27 for computing Ec/Io of a pilot signal contained in the multiplexed signal, and controlling transmission power of the pilot signal so as to be increased if the computed Ec/Io is lower than a set Ec/Io value; a TX unit 22 for modulating the multiplexed signal and transmitting the resulting signal; an M unit 28 connected to both the RX unit 21 and TX unit 22; and a transmission power control unit 25 for varying transmission power of the speech frame signal 50 by computing the electric field intensity 61 and a reference value sent via the special line 1.

Also, as shown in the drawing, a BSC 10 comprises: a speech frame signal selecting unit 11 for selecting a signal with the highest signal quality based on speech data signal quality information 65 contained in the speech control frame signal 70 sent via the special line 1, and comparing the quality of the selected signal with a predetermined reference value; a speech coder 12 for converting speech data 64 into a speech signal; and a control processing unit 13 for extracting the electric field intensity 61 from transmission power report information 60 and generating a reference value.

FIG. 8 is a view showing an arrangement of an MS 30 in accordance with one embodiment of the present invention.

As shown in the drawing, the MS 30 comprises: an M unit 35 for receiving and outputting a radio signal 2; an RX unit 31 for receiving the radio signal 2 via the M unit 35 and demodulating the same; a decoder 33 for decoding the demodulated signal into the speech frame signal 50; a speech frame signal mixing unit 36 for judging usable speech data 51 based on speech data signal pass/fail information 52 contained in the speech frame signal 50 and composing the usable speech data 51 by assigning weights with the reception signal electric field intensity; a speech coder 37 for converting the speech data 51 into a speech signal; a coder 34 for encoding the speech frame signal 50; and a TX unit 32 for modulating the encoded signal and transmitting the resulting signal.

Figure 10:
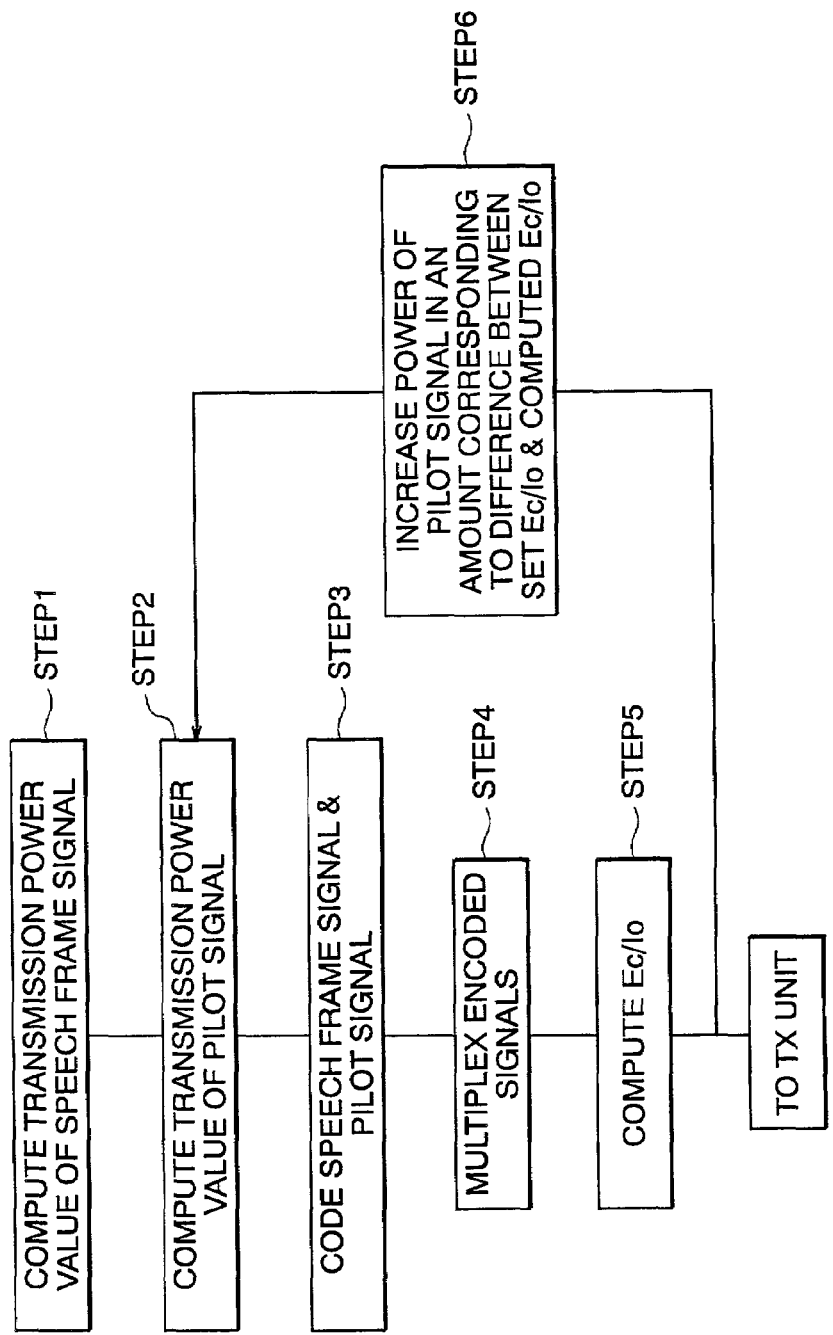
FIG. 10 is a flowchart detailing one embodiment of the present invention.

Next, the following description will describe an operation in accordance with the present embodiment with reference to FIG. 10. FIG. 10 is a flowchart detailing a control method of the transmission power of the pilot signal in the present embodiment. At the end of the BTS 20, the transmission power control unit 25 computes an optimal transmission power value of the speech frame signal 50 based on the speech frame signal 50, electric field intensity 61 and reference value sent from the BSC 10 via the special line 1, and transmits the transmission power value data to the coder 24 (Step 1).

The pilot power control unit 27 computes a transmission power value of the pilot signal and transmits a command signal to the coder 24 to change the transmission power value of the pilot signal. In case that no command is issued, an initial set value is used (Step 2).

The coder 24 encodes the speech frame signal 50 and pilot signal. These encoded signals are sent to the multiplexing unit 26 (Step 3).

The multiplexing unit 26 composes each of the encoded signals and generates a multiplex wave (Step 4).

The pilot power control unit 27 computes the Ec/Io of the pilot signal from the multiplex wave generated by the multiplexing unit 26 (Step 5).

In case that the transmission power of the multiplex wave is lower than the maximum output power allowable standard value, the computed Ec/Io is equal to or greater than the set Ec/Io. In this case, no command is issued to the coder 24 to change the transmission power of the pilot signal. In case that the transmission power of the multiplex wave is greater than the maximum output power allowable standard value, the computed Ec/Io is smaller than the set Ec/Io, and the transmission power of the multiplex wave increases further above the maximum output power allowable standard value, then a command is issued to the coder 24 to change the transmission power value of the pilot signal, so that the computed Ec/Io is maintained equal to the set Ec/Io. Likewise, in case that the transmission power of the multiplex wave is equal to the maximum output power allowable standard value, the computed Ec/Io is smaller than the set Ec/Io, and the transmission power of the multiplex wave is lowered to the maximum output power allowable standard value, then a command is issued to the coder 24 to change the transmission power value of the pilot signal, so that the computed Ec/Io is maintained equal to the set Ec/Io (Step 6).

Further, the following description will describe the control method of the power transmission of the pilot signal of the present embodiment with more concrete numerical example values.

That is, given 20W as the maximum output power allowable standard value of the TX unit in the BTS 20 determined by the cell design, and 4W as the initial set value of the pilot signal. Then, the set Ec/Io is −7 dB.

At the end of the BTS 20, the transmission power control unit 25 receives return data from the BSC 10 via the special line 1. The transmission power control unit 25 computes an optimal transmission power value of the speech frame signal 50 based on the electric field intensity 61 and reference value, and transmits the transmission power value thus computed to the coder 24.

The pilot power control unit 27 designates 4W given as the initial set value of the pilot signal as the transmission power value and notifies the coder 24 of the designation. The coder 24 encodes the speech frame signal 50 having undergone the power control and the pilot signal at the initial set value having not undergone the power control. The coder 24 determines the transmission power according to a down link transmission power value, which is a sum of the transmission power value of the speech frame signal 50 and 4W given as the initial set value of the pilot signal, and transmits the transmission power data thus determined to the multiplexing unit 26.

The multiplexing unit 26 composes the speech frame signal 50 and pilot signal, and transmits the resulting multiplex wave to the TX unit 22.

Then, in case that the set Ec/Io computed from the Ec/Io of the pilot signal contained in the multiplex wave is lower than −7 dB, the pilot power control unit 27 transmits a command signal to the coder 24 to change the transmission power value of the pilot signal, so that the transmission power of the pilot signal is increased until the Ec/Io of the pilot signal contained in the multiplex wave reaches −7 dB. In case that the Ec/Io of the pilot signal is larger than −7 dB, no command is issued to the coder 24 to change the transmission power value of the pilot signal.

The pilot power control unit 27 computes the set value (−7 dB) of the set Ec/Io based on 20W given as the maximum output power allowable standard value of the TX unit 22 and 4W given as the initial set value of the pilot signal.

Figure 11A:
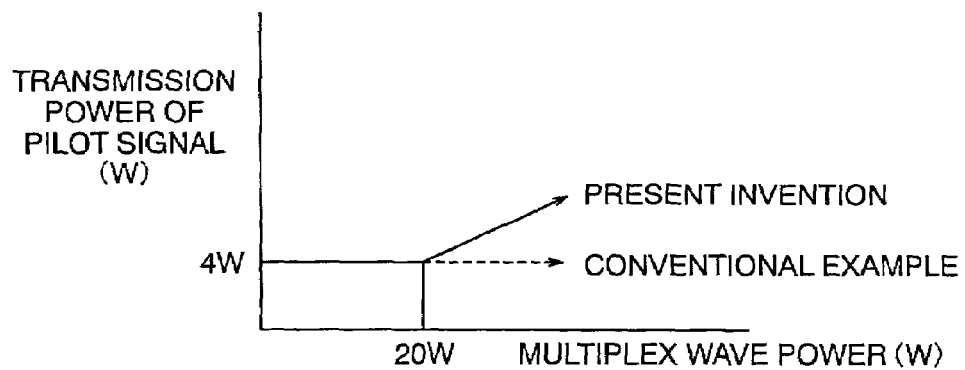
FIG. 11A is a graph showing a relation of multiplex wave power versus transmission power of a pilot signal.
Figure 11B:
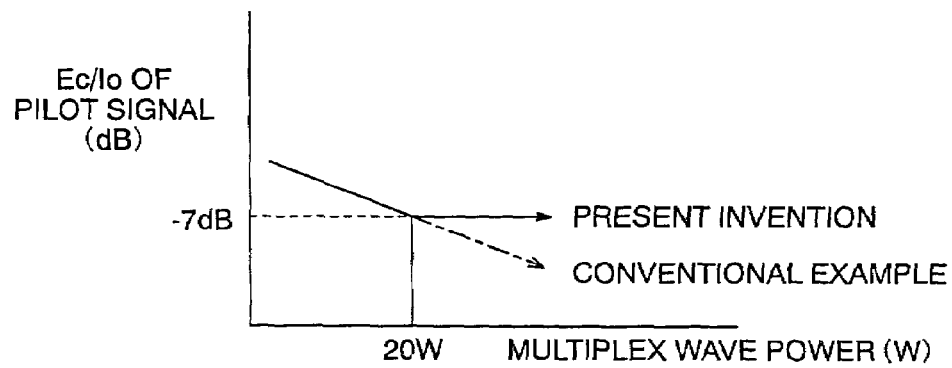
FIG. 11B is a graph showing a relation of multiplex wave power versus Ec/Io of a pilot signal.

FIG. 11A is a view showing a relation of the multiplex wave power versus the pilot signal power. FIG. 11B is a view showing a relation of the multiplex wave power versus the Ec/Io of the pilot signal.

FIG. 11A indicates that the transmission power is controlled in such a manner that, when the multiplex wave power is 20W or lower, the transmission power of the pilot signal is maintained at 4W, and when the multiplex wave power exceeds 20W, the Ec/Io is maintained at −7 dB.

Figure 11C:
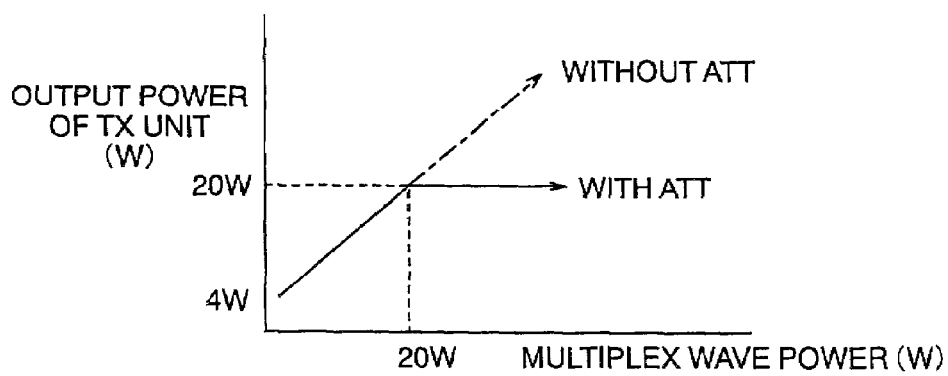
FIG. 11C is a graph showing a relation of multiplex wave power versus output power from a TX unit.

FIG. 11B indicates that the transmission power is controlled in such a manner that, when the multiplex wave power is 20W or lower, a state where the Ec/Io of the pilot signal is greater than −7 dB is maintained, and when the multiplex wave power exceeds 20W, the Ec/Io is maintained at −7 dB. The larger the allowable output power of the multiplex wave, the larger the TX unit 22 becomes in physical size. This is the reason why the maximum output power allowable standard is provided. A phenomenon such that the Ec/Io of the pilot signal contained in the multiplex wave drops below the set Ec/Io in trying to allocate higher traffic intensity for each cell (or sector) occurs when the input is increased above the maximum output allowable standard of the TX unit 22. As shown in FIG. 11C, the amplifier circuit in the TX unit 22 has a limit of 20W at the maximum output in the linear characteristics. Thus, the output value is maintained at or below the maximum output power allowable value by providing the ATT at the input within the TX unit 22 to control in such a manner that output power equal to or greater than the maximum output power allowable standard value will not be outputted.

As has been discussed, the present invention achieves the following effects.

According to the control method of the transmission power of the pilot signal of the present invention, even when the traffic intensity per cell is high, it is possible to control the transmission power by increasing the transmission power of the pilot signal, so that the Ec/Io of the pilot signal will not drop below the set Ec/Io. Consequently, it is possible to prevent the radius of the cell from becoming smaller the one set by the cell design. As a result, the soft H/O function unique to the CDMA communication method can be performed smoothly. Also, it is possible to prevent generation of an area where the soft H/O cannot be performed.

In addition, in case that the traffic intensity per cell is low, inconvenience caused by the pilot pollution can be lessened by maintaining the Ec/Io at a constant level by controlling the pilot signal. Consequently, it is possible to prevent the system from becoming too tight, and therefore, a satisfactory sound quality can be provided without any interruption.

What is claimed is:

1. A CDMA communication system, comprising a base station radio unit, a base station control unit, and a mobile station terminal unit;
   wherein said base station radio unit comprises a pilot power control unit for controlling a desired wave power-to-interference wave power ratio of a pilot signal to stay at a preset value, and
   wherein said base station radio unit further comprises:
   a reception unit for receiving and demodulating a radio signal from said mobile station terminal unit;
   a decoder for decoding a demodulated signal into a speech control frame signal;
   a coder for encoding a speech frame signal sent from said base station control unit;
   a transmitting unit for modulating an encoded signal and transmitting said encoded signal;
   a transmission power control unit for computing an optimal transmission power value of said speech frame signal based on electric field intensity and a reference value, and transmitting said optimal transmission power value to said coder; and
   a multiplexing unit for composing said encoded signal, and
   wherein said pilot power control unit receives a multiplex wave from said multiplex unit, and controls the desired wave power-to-interference wave power ratio of the pilot signal to stay at said preset value only when multiplex wave power exceeds a predetermined value.

2. The CDMA communication system as claimed in claim 1, wherein:
   said pilot power control unit receives the multiplex wave from said multiplexing unit, and computes the desired wave power-to-interference wave power ratio of the pilot signal, and transmits a command signal to said coder to change a power transmission value of the pilot signal in an amount corresponding to a difference between said desired wave power-to-interference wave power ratio computed and a set desired wave power-to-interference wave power ratio.

3. The CDMA communication system as claimed in claim 1, wherein:
   said pilot power control unit receives the multiplex wave from said multiplexing unit, and transmits a command signal to said coder to change a transmission power value of the pilot signal only when multiplex wave power exceeds a predetermined value.

4. The CDMA communication system as claimed in claim 1, wherein:

said pilot power control unit receives the multiplex wave from said multiplexing unit and computes the desired wave power-to-interference wave power ratio of the pilot signal, only when the multiplex wave power exceeds a predetermined value, said pilot power control unit transmitting a command signal to said coder to increase a transmission power value of the pilot signal set by said coder, so that said desired wave power-to-interference wave power ratio computed is equal to a set desired wave power-to-interference wave power ratio.

5. The CDMA communication system as claimed in claim 1, wherein:

said pilot power control unit designates an initial set value of the pilot signal as a transmission power value to said coder;

said coder encoding the speech frame signal having performed power control and the pilot signal at the initial set value having not performed power control, and deciding transmission power according to a down link transmission power value, which is a sum of the transmission power value of the speech frame signal and the initial set value of the pilot signal, and transmitting the transmission power data to said multiplexing unit; and said multiplexing unit composing the speech frame signal and pilot signal, and transmitting the multiplex wave to said transmitting unit.

6. The CDMA communication system as claimed in claim 1, wherein said base station control unit comprises:

a speech frame signal selecting unit for selecting a signal with a highest signal quality based on speech data signal quality information contained in a speech control frame signal sent via a special line, and comparing a quality of said signal selected with a predetermined reference value;

a speech coder for converting speech data into a speech signal; and a control processing unit for extracting electric field intensity from transmission power report information and generating a reference value.

* * * * *